(12) United States Patent
Van Maanen

(10) Patent No.: US 8,042,993 B2
(45) Date of Patent: Oct. 25, 2011

(54) AIR-COOLED POWER ELECTRONICS SERVICE ALGORITHM

(75) Inventor: Keith D. Van Maanen, Birmingham, MI (US)

(73) Assignee: GM Global Technology Operations LLC

(*) Notice: Subject to any disclaimer, the term of this patent is extended or adjusted under 35 U.S.C. 154(b) by 622 days.

(21) Appl. No.: 12/029,733

(22) Filed: Feb. 12, 2008

(65) Prior Publication Data

US 2009/0164150 A1   Jun. 25, 2009

Related U.S. Application Data

(60) Provisional application No. 61/015,914, filed on Dec. 21, 2007.

(51) Int. Cl.
*G01K 17/00* (2006.01)
*G01N 25/00* (2006.01)

(52) U.S. Cl. ............................. 374/43; 374/29

(58) Field of Classification Search ............... 374/29, 374/43
See application file for complete search history.

(56) References Cited

U.S. PATENT DOCUMENTS

| | | | |
|---|---|---|---|
| 4,902,139 A * | 2/1990 | Adiutori | 374/137 |
| 5,712,802 A | 1/1998 | Kumar et al. | |
| 6,203,191 B1 * | 3/2001 | Mongan | 374/43 |
| 6,663,278 B1 * | 12/2003 | Chien et al. | 374/43 |
| 7,652,585 B2 * | 1/2010 | Schierling | 340/635 |
| 2004/0264124 A1 * | 12/2004 | Patel et al. | 361/686 |
| 2005/0273208 A1 * | 12/2005 | Yazawa et al. | 700/299 |
| 2007/0014091 A1 * | 1/2007 | Chang | 361/704 |
| 2007/0047614 A1 * | 3/2007 | Lee et al. | 374/44 |
| 2007/0071063 A1 * | 3/2007 | Liu et al. | 374/15 |
| 2008/0075137 A1 * | 3/2008 | Cervantes et al. | 374/1 |
| 2008/0272924 A1 | 11/2008 | Schierling | |

FOREIGN PATENT DOCUMENTS

| CN | 1942982 A | 4/2007 |
|---|---|---|
| EP | 1193756 A1 | 4/2002 |
| WO | WO 2005101431 A1 * | 10/2005 |

* cited by examiner

*Primary Examiner* — Lisa Caputo
*Assistant Examiner* — Mirellys Jagan

(57) ABSTRACT

A method for determining the thermal efficiency of a heat sink for an electrical component includes determining an estimated temperature of the heat sink, determining an actual temperature of the heat sink, and determining a thermal efficiency of the heat sink based on a comparison of the estimated temperature of the heat sink to the actual temperature of the heat sink. A related diagnostic system is provided.

13 Claims, 3 Drawing Sheets

AIR-COOLED POWER ELECTRONICS SERVICE ALGORITHM

CROSS-REFERENCE TO RELATED APPLICATIONS

This application claims the benefit of U.S. Provisional Application No. 61/015,914, filed on Dec. 21, 2007. The disclosure of the above application is incorporated herein by reference.

FIELD

The present disclosure relates to power electronic devices, and more specifically to systems and methods for determining the efficiency of a heat sink for power electronic devices.

BACKGROUND

The statements in this section merely provide background information related to the present disclosure and may not constitute prior art.

During the operation of power electronic devices, heat is generated as a result of the current that flows through the devices. Effectively dissipating the heat that is produced during the operation of electronic devices is an important concern in optimizing the performance and ensuring the longevity of the components and circuitry that are integral to such devices.

Heat dissipation is particularly important in the case of high power electronic devices. One such example is a belt alternator system used in hybrid vehicles. Batteries and power electronics associated with belt alternator starter systems are capable of delivering and receiving as much as 10 kW of peak electrical power, necessitating the use of auxiliary cooling devices for the batteries and the power electronics.

Where auxiliary cooling is desired for the proper operation of an electronic device, heat sinks can be attached to the heat-producing electronic devices in a thermally conductive manner to absorb heat generated by the electronic device and efficiently transfer the heat to its surroundings. Accordingly, heat sinks are formed of a material having a high thermal conductivity, usually a metallic material. Many heat sinks include extended surfaces, such as fins, to increase the heat transfer rate from the electronic device to its surroundings by increasing the effective surface area of the heat sink. Furthermore, ambient air can be forced along the extended surface of a heat sink to further increase the heat transfer rate of the heat sink.

Heat sink performance can be negatively affected in a variety of ways. Heat sinks made from metallic substances can corrode due to exposure to heat, moisture, and corrosives present in the ambient air. Corrosive layers that form on the surface of a heat sink are generally thermally insulating in comparison to the base material and inhibit the transfer of heat from the heat sink to its surroundings. Additionally, contaminants present in the ambient air, such as dust and dirt, can attach or collect on the surface of a heat sink and form thermally insulating layers.

Heat sink performance can degrade to a point that heat generated by the electronic device is not sufficiently dissipated to the device's surroundings and excessive heat will build within the electronic device, leading to elevated operating temperatures. Elevated operating temperatures may result in degraded performance of the electronic device or damage to the electronic device.

SUMMARY

Thus, the present disclosure provides a method and an apparatus for determining the thermal efficiency of a heat sink used to cool a battery or other power electronics device. In one form, the present teachings provide a diagnostic system comprising a first temperature sensor configured to measure an actual temperature of a heat sink in thermal contact with an electrical component; a cooling air mass in contact with the heat sink; a second temperature sensor configured to measure a temperature of the cooling air mass; and a control module that determines an estimated temperature of the heat sink based on the temperature of the cooling air mass, wherein the estimated temperature is compared to the actual temperature to determine whether the heat sink is functioning properly.

In another form, the present teachings provide a method of determining a thermal efficiency of a heat sink for an electrical component comprising determining an estimated temperature of the heat sink; determining an actual temperature of the heat sink; and determining the thermal efficiency of the heat sink based on a comparison of the estimated temperature of the heat sink and the actual temperature of the heat sink.

In another aspect, the present teachings provide a method of determining a thermal efficiency of a heat sink for an electrical component that includes determining an average power of the electrical component during one of N time intervals, wherein N is an integer greater than or equal to one; determining an average temperature of a cooling air during the one of N time intervals; determining an average mass air flow of the cooling air during the one of N time intervals; and determining the estimated temperature at the one of N time intervals based on the average power of said electrical component, the average temperature of the cooling air, and the average mass air flow of the cooling air.

In yet another aspect, the present teachings provide a method of determining a thermal efficiency of a heat sink for an electrical component comprising determining an estimated temperature of the heat sink at N time intervals, wherein N is an integer that is greater than 1 and the estimated temperature at an $i^{th}$ of the N time intervals is based on the estimated temperature at an $(i-1)^{th}$ of the N time intervals where $1 < i \leq N$; measuring an actual temperature of the heat sink at the N time intervals; calculating a difference between the estimated temperature and the actual temperature at the N time intervals; and generating a status signal associated with the thermal efficiency of the heat sink based on a comparison of the difference to a predetermined value.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
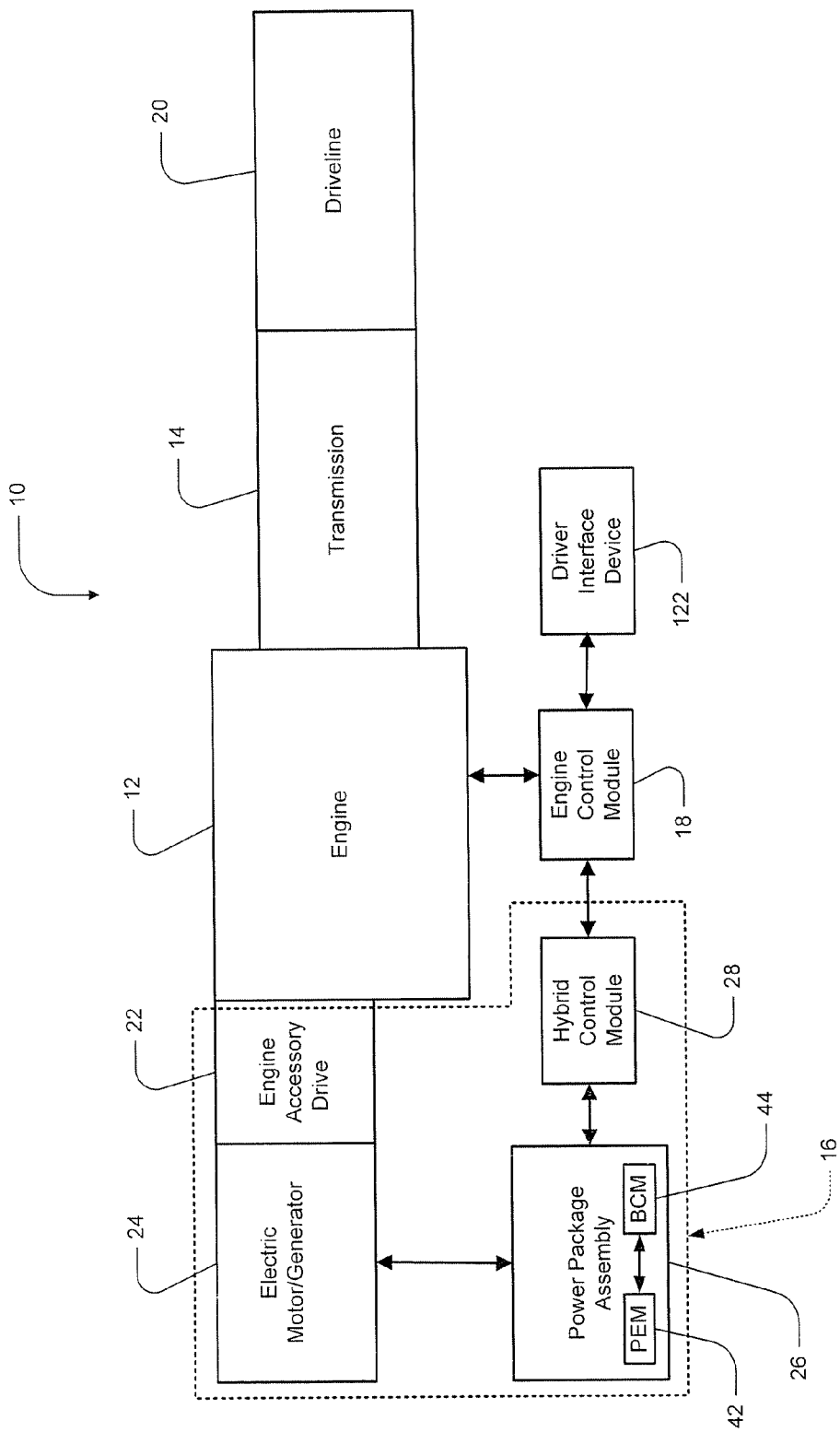
FIG. 1 is a block diagram of a partial powertrain for a hybrid vehicle having a belt alternator system incorporating the principles of the present disclosure.

Referring to FIG. 1, a partial schematic illustration of the powertrain for a hybrid vehicle 10 is shown. Vehicle 10 includes an engine 12, an automatic transmission 14, a belt alternator hybrid (BAS) system 16, and an engine control module (ECM) 18. Engine 12 produces driving torque that is transferred through transmission 14, at varying gear ratios, to a driveline 20 to drive at least one pair of wheels (not shown). BAS system 16 is operable to improve the fuel economy of vehicle 10 by shutting off engine 12 at idle, providing for a quick restart of engine 12, and optimizing battery charging under certain conditions. To this end, BAS system 16 includes an engine accessory drive 22, an electric motor/generator 24, a power package assembly 26, and a hybrid control module 28. Engine accessory drive 22 is operable to transfer motoring torque from engine 12 to electric motor/generator 24. Engine accessory drive 22 is also operable to transfer torque generated by electric motor/generator 24 to engine 12. Electric motor/generator 24 is operable to supply an electrical charge to power package assembly 26 while being driven by engine 12. Electric motor/generator 24 is also operable to provide drive torque to engine 12 while receiving electrical power from power package assembly 26.

Figure 2:
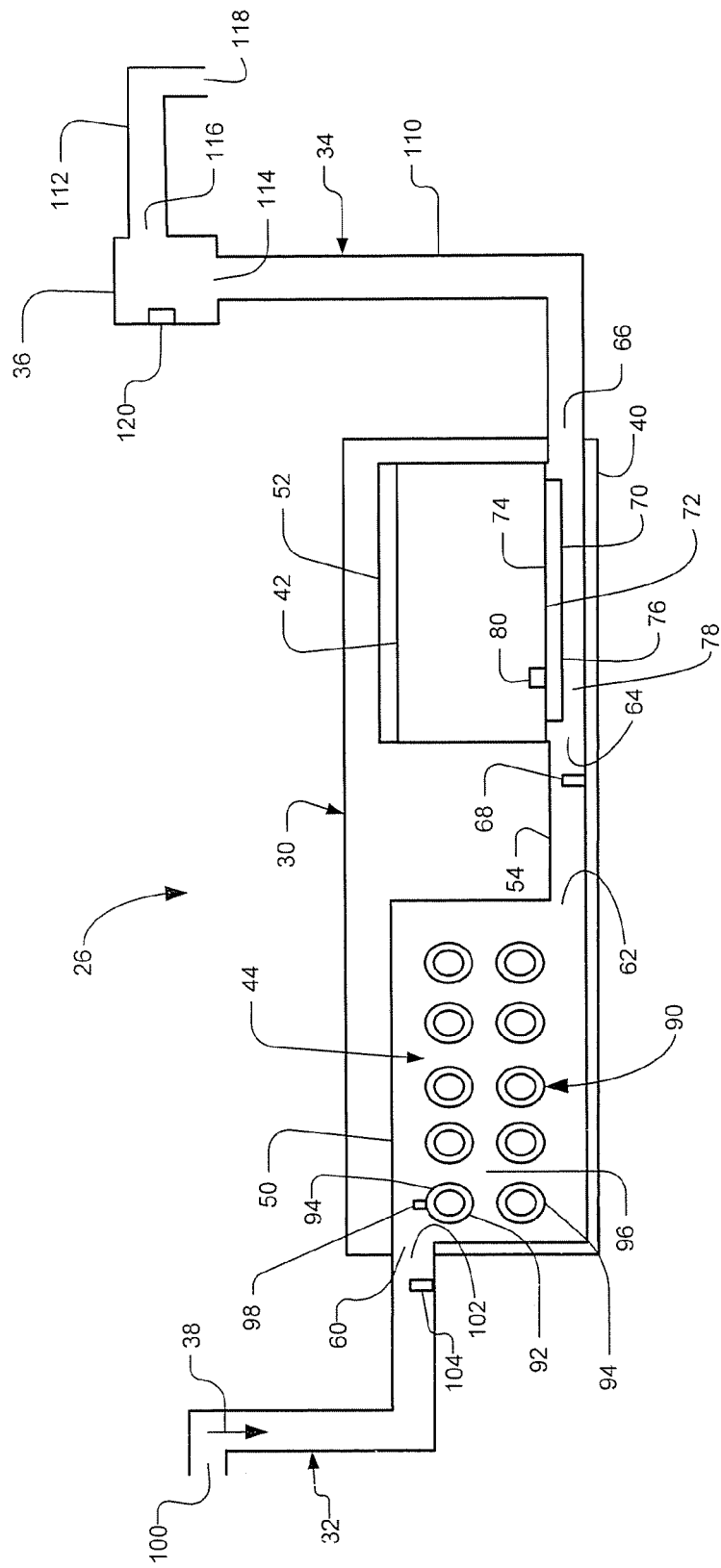
FIG. 2 is a schematic illustration of the power package assembly of the belt alternator system shown in FIG. 1.

Referring now to FIG. 2, power package assembly 26 is shown to include a power package module 30, a cooling air supply duct assembly 32, and a cooling air exhaust duct assembly 34 that includes a fan 36 for drawing cooling air 38 through power package module 30. Power package module 30 controls the operation of electric motor/generator 24 and provides 12-volt accessory power for other electrical components associated with vehicle 10. To this end, power package module 30 includes a housing 40 mounted to vehicle 10, a power electronics module 42, and a battery cell module 44. Housing 40 includes a first enclosure 50, a second enclosure 52, and an intermediate duct 54. First enclosure 50 is disposed on one end of housing 40 and includes an inlet port 60 that is connected to supply duct assembly 32 and an outlet port 62 that is connected to one end of intermediate duct 54. First enclosure 50 is preferably configured to allow cooling air 38 entering first enclosure 50 through inlet port 60 to flow efficiently through first enclosure 50 to outlet port 62. Second enclosure 52 is disposed on an opposite end of housing 40 and includes an inlet port 64 that is connected to an end of intermediate duct 54 opposite outlet port 62 and an exhaust port 66 that is connected to exhaust duct assembly 34. Second enclosure 52 is preferably configured to allow cooling air 38 entering second enclosure 52 through inlet port 64 to flow efficiently through second enclosure 52 to exhaust port 66. Intermediate duct 54 is disposed between first enclosure 50 and second enclosure 52 and is configured to deliver cooling air 38 entering intermediate duct 54 from outlet port 62 of first enclosure 50 to inlet port 64 of second enclosure 52. Intermediate duct 54 can include a thermocouple 68 to measure the temperature of cooling air 38 entering second enclosure 52. Accordingly, thermocouple 68 can be disposed within intermediate duct 54 proximate inlet port 64 as shown.

It will be appreciated that first enclosure 50, second enclosure 52, and intermediate duct 54 work together to provide a sealed enclosure for transferring cooling air 38 received through supply duct assembly 32 to exhaust duct assembly 34.

Power electronics module (PEM) 42 is supported within second enclosure 52 and is operable to control the electric motor/generator 24 based on a command signal by hybrid control module 28. In a motoring mode, PEM 42 receives electrical power from battery cell module 44 to operate electric motor/generator 24 to restart or provide additional power to engine 12. In a generating mode, PEM 42 receives electrical power from motor/generator 24 to charge battery cell module 44. In operation, PEM 42 generates heat that can be dissipated by attaching a heat sink 70 to PEM 42 in any heat conductive manner. As best seen in FIG. 2, heat sink 70 can be attached to PEM 42 along a thermal transfer face 72 associated with PEM 42. Heat sink 70 can include a base surface 74 adjoining thermal transfer face 72 and a plurality of fins forming an extended surface 76 opposite base surface 74. Extended surface 76 can work together with second enclosure 52 to define a cooling channel 78 through which cooling air 38 within second enclosure 52 passes as it moves from inlet port 64 to exhaust port 66. In this manner, heat generated by PEM 42 can be transferred through thermal transfer face 72 and heat sink 70 to cooling air 38. PEM 42 can further include thermocouple 80 disposed on base surface 74 between heat sink 70 and thermal transfer face 72 of PEM 42 to measure the temperature of base surface 74.

Battery cell module (BCM) 44 is supported within first enclosure 50 and is operable to deliver electrical power to PEM 42 while BAS system 16 is in a motoring mode. BCM 44 is also operable to receive electrical power from PEM 42 while BAS system 16 is in a generating mode. Accordingly, BCM 44 can include a plurality of battery cells 90 as shown. The battery cells 90 may be of any suitable type. For example, the battery cells 90 may be nickel metal hydride (NiMH) battery cells. Alternatively, the battery cells 90 may be lithium-ion (Li-ion) battery cells. As discussed herein, the battery cells 90 are Li-ion battery cells. During the operation of BAS system 16, electrical current flowing through battery cells 90 will generate heat within each of the battery cells 90. To facilitate cooling, each one of battery cells 90 can include a corresponding one of thermal housings 92 for dissipating the heat generated within a corresponding one of battery cells 90 to cooling air 38. Thermal housings 92 can be formed of any suitable thermally conductive material and can include an outer surface 94 exposed to cooling air 38 within first enclosure 50. To facilitate cooling, battery cells 90 can preferably be spaced apart by gaps to form an air passageway 96 and positioned within first enclosure 50 such that cooling air 38 can pass between battery cells 90 and along outer surface 94 of each of the battery cells 90 as it flows from inlet port 60 to outlet port 62. As shown in FIG. 2, BCM 44 can further include a thermocouple 98 disposed on outer surface 94 of one of battery cells 90 to measure the temperature of outer surface 94.

Supply duct assembly 32 is configured to deliver cooling air 38 to power package module 30 and includes a supply port 100, a supply outlet 102, and a thermocouple 104. Supply port 100 is disposed on one end of supply duct assembly 32 and can be located in the passenger compartment associated with vehicle 10 to draw in air that has been conditioned by the heating, ventilation and/or air conditioning system associated with vehicle 10. Alternatively, supply port 100 can be located on the exterior of vehicle 10 to draw in ambient air surrounding vehicle 10. Supply outlet 102 is disposed on an opposite end of supply duct assembly 32 and connects supply duct assembly 32 to inlet port 60 of BCM 44. Thermocouple 104 is configured to measure the temperature of cooling air 38 as it exits supply duct assembly 32 and enters first enclosure 50 of power package module 30. Accordingly, thermocouple 104 can be disposed within supply duct assembly 32 proximate supply outlet 102 as shown.

Exhaust duct assembly 34 is configured to deliver cooling air 38 drawn through power package module 30 by fan 36 to the ambient environment. Accordingly, exhaust duct assembly 34 includes a suction duct 110 for delivering cooling air 38 from power package module 30 to fan 36 and a pressure duct 112 for delivering cooling air 38 from fan 36 to the ambient environment. Suction duct 110 is connected to exhaust port 66 of second enclosure 52 on one end and to an inlet 114 of fan 36 on an opposite end. Pressure duct 112 is connected to an outlet 116 of fan 36 on one end and includes an exhaust port 118 on an opposite end. Exhaust port 118 may be located on the exterior of vehicle 10.

Fan 36 is operable to draw a sufficient amount of cooling air 38 through power package module 30 to cool PEM 42 and BCM 44 and can be of any conventional type for moving air. Fan 36 may be a centrifugal fan that can be operated at variable speeds to alter the flow of cooling air 38 through power package module 30. Fan 36 includes a position sensor 120 that generates a signal that can be used by hybrid control module 28 to determine the speed at which fan 36 is operating.

Hybrid control module 28 controls the operation of BAS system 16 and is operable to determine when BCM 44 or PEM 42 is not cooling properly as will be described. Based on the input signals it receives from ECM 18, hybrid control module 28 generates a control signal to PEM 42 that commands BAS system 16 to operate in either a motoring mode or a generating mode. In both modes, hybrid control module 28 obtains various information related to the operation of PEM 42 and BCM 44. Specifically, hybrid control module 28 measures the electrical current and voltage associated with the operation of PEM 42 and BCM 44. Hybrid control module 28 also obtains the operating temperature of PEM 42 and BCM 44 from thermocouples 80, 98, respectively, and the temperature of cooling air 38 from thermocouple 104. Hybrid control module 28 controls the operation of fan 36 and can vary the amount of cooling air 38 flowing through power package module 30 as may be desired. Specifically, hybrid control module 28 can generate a power signal that is pulse width modulated to vary the speed of fan 36. Based on the operating information it obtains regarding BAS system 16, hybrid control module 28 can also generate an output signal to ECM 18 that indicates the cooling status for BCM 44 and PEM 42.

ECM 18 controls the operation of engine 12 and communicates pertinent information related to the operation of engine 12 and BAS system 16 to a driver interface device 122. Accordingly, ECM 18 receives input signals from and sends control signals to engine 12. ECM 18 also communicates with hybrid control module 28 to coordinate the operation of engine 12 and BAS system 16 and to obtain information related to the cooling status for BCM 44 and PEM 42. Based on the status signal it receives from hybrid control module 28, ECM 18 can generate a signal to driver interface device 122 that illuminates a service light indicating the need to service power package assembly 26.

Figure 3:
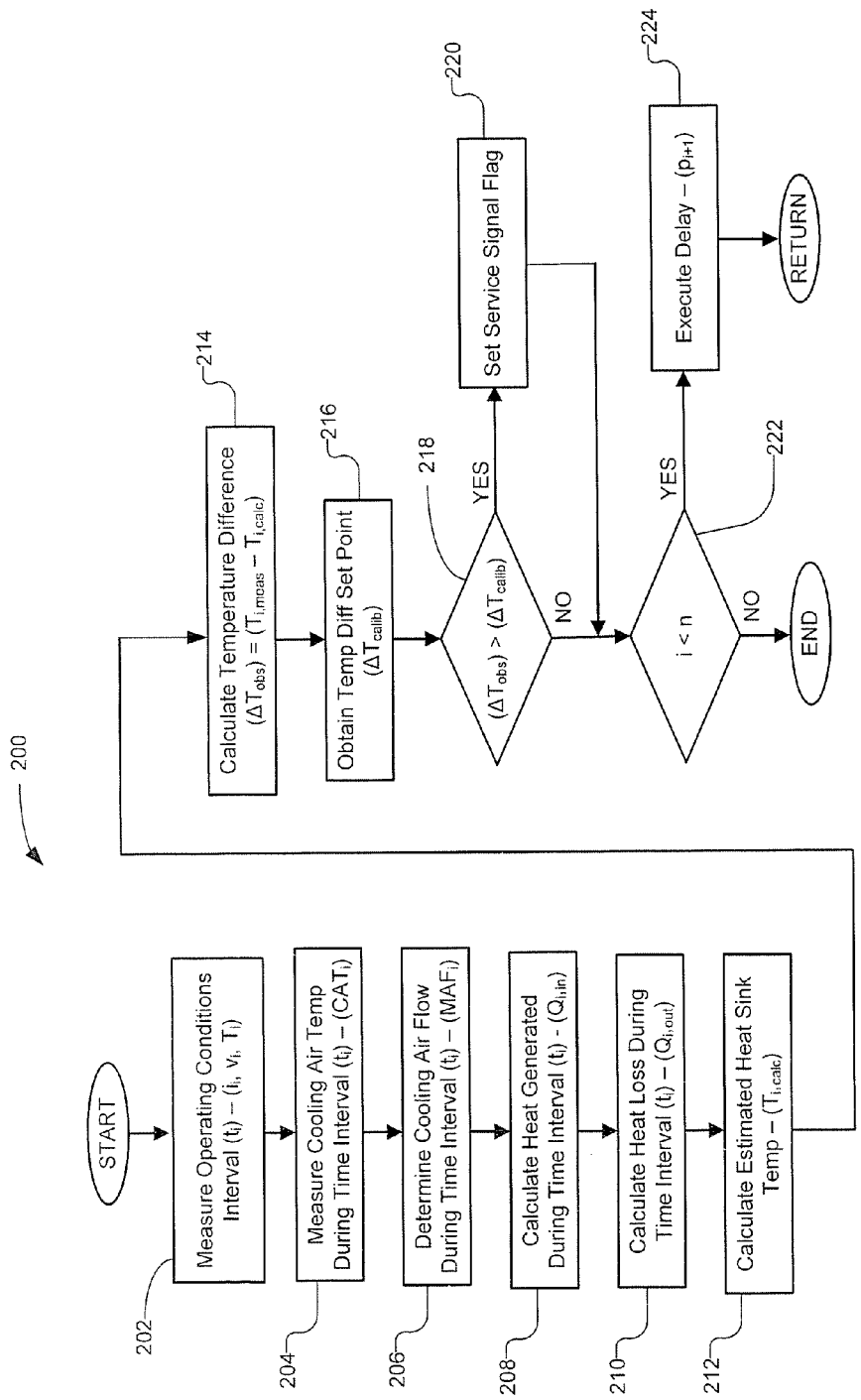
FIG. 3 is a flow chart illustrating a service algorithm for the belt alternator system of FIG. 2 according to the principles of the present disclosure.

Referring to FIG. 3, a flowchart illustrating the steps performed by ECM 18 and hybrid control module 28 to execute a service algorithm 200 in accordance with the present disclosure will now be described in detail. Service algorithm 200 can be implemented as computer programs stored in the memories of ECM 18 and hybrid control module 28 that run periodically while engine 12 is running to generate a status signal corresponding to the cooling efficiency of power package assembly 26. Generally, service algorithm 200 will be run at the same frequency as other service diagnostic routines associated with the proper operation of BAS system 16. Accordingly, the decision to run service algorithm 200 can be made by ECM 18 or hybrid control module 28 based on a prescribed time interval or a set of operating conditions. For purposes of this disclosure, service algorithm 200 is stored in the memory of hybrid control module 28 and the decision to run service algorithm 200 is made by hybrid control module 28.

Service algorithm 200 begins with step 202 and continues in a recursive fashion for a predetermined number (n) of time intervals (i), where $1 \leq i \leq n$. The predetermined number (n) and length ($t_i$) of each of each time interval (i) during which service algorithm 200 runs can vary. Additionally, a time delay (p) can exist between subsequent time intervals. The time delay ($p_{i+1}$) between the end of time interval ($t_i$) and the beginning of the subsequent time interval ($t_{i+1}$) can vary between zero and some predetermined value. Put another way, each iteration of service algorithm 200 can run without an associated time delay. Alternatively, each iteration of service algorithm 200 can include a time delay. For exemplary purposes, the number of time intervals can be three (n=3), where $t_1$=100 msec, $t_2$=50 msec, $t_3$=50 msec, $p_2$=0 msec and $p_3$=0 msec. Thus, in this example, the total duration of time during which hybrid control module 28 is obtaining information at step 202 is 200 msec ($t_1+t_2+t_3$). In addition, since $p_2$ and $p_3$ are zero, there is no time delay between time intervals $t_1$ and $t_2$ or between time intervals $t_2$ and $t_3$.

At step 202, hybrid control module 28 obtains various information related to the operation of power package assembly 26 during time interval ($t_i$). Specifically, hybrid control module 28 measures the electrical current ($i_i$) and voltage ($v_i$) supplied to PEM 42 and BCM 44 during the prescribed time interval ($t_i$). At step 202, hybrid control module 28 also obtains the actual operating temperatures of PEM 42 and BCM 44 from thermocouples 80, 98, respectively, during the prescribed time interval ($t_i$).

Concurrently at step 204, hybrid control module 28 obtains the temperature of cooling air 38 ($CAT_i$) entering first enclosure 50 and second enclosure 52 from thermocouples 104, 68, respectively, during the prescribed time interval ($t_i$).

Next at step 206, hybrid control module 28 determines the average mass air flow (MAF) of cooling air 38 entering first and second enclosures 50, 52 during the prescribed time interval ($t_i$). It will be noted that the correlation between mass air flow and the speed of fan 36 can be known through available manufacturer's data or, alternately, through testing. Accordingly, hybrid control module 28 can determine the mass air flow of cooling air 38 during the prescribed time interval ($t_i$) by determining the speed of fan 36 during the prescribed time interval ($t_i$). In one example, hybrid control module 28 obtains the signal generated by position sensor 120 of fan 36 during the prescribed time interval ($t_i$) and determines the corresponding average fan speed ($w_i$). Hybrid control module 28 then determines the average mass air flow of cooling air 38 flowing though power package module 30 during the prescribed time interval ($t_i$) using the average fan speed ($w_i$) during the prescribed time interval ($t_i$) and the formula $(MAF)=(F) \times (w_i) \times (t_i)$, where (F) is a constant of proportionality relating mass air flow rate and fan speed. Other methods of determining MAF may alternatively be implemented.

Next, at step 208 hybrid control module 28 determines the heat generated by PEM 42 and BCM 44. The rate at which heat is generated by an electrical device will vary, depending on the type of device and the specific operating conditions. Generally, the rate at which heat is generated by an electrical device during a period of time is a function of the current and voltage (i.e. power) at which the electrical device is operated during the period of time. For example, a simple resistive electronic device will generate heat at a rate $(q)=(I)^2 \times (R_e)$, where (I) is the current passing through the device and $(R_e)$ is the equivalent resistance of the device. For more complex electrical devices such as PEM 42 and BCM 44, the rate at which heat is generated $(q_{in})$ by the electrical device can additionally be a function of the temperature at which the device is operated. The rate at which heat is generated by PEM 42 and BCM 44 under various operating conditions (i.e. voltage, current, temperature) can be known through thermal modeling of the devices or through performance testing. In some cases, such information will be available from the manufacturer of the electronic device.

For the purposes of this disclosure, the rate at which heat is generated by PEM 42 and BCM 44 under various operating conditions is learned through performance testing of PEM 42 and BCM 44 that includes operating a properly functioning PEM 42 and BCM 44 under varying current, voltage, and temperature conditions and measuring the rate at which heat is generated by the devices. Using this information, tables relating the rate at which heat is generated by PEM 42 and BCM 44 for varying voltage, current, and temperature values are created and stored within the memory of hybrid control module 28. Thus, at step 208, hybrid control module 28 uses the average of the current, voltage and temperature measurements obtained at step 202 to look up in the tables the corresponding rate at which heat is generated by PEM 42 and BCM 44 during time interval $(t_i)$. Hybrid control module 28 then calculates the corresponding heat generated by each device $(Q_{i,in})$ during the time interval $(t_i)$ using the formula $(Q_{i,in}) = (q_{i,in}) \times (t_i)$.

Next, at step 210 hybrid control module 28 determines the amount of heat dissipated by heat sink 70 of PEM 42 and thermal housings 92 of BCM 44. The rate at which a heat sink dissipates heat will vary depending on its configuration and the thermal conditions in which it is operating. Generally, the rate at which heat will be dissipated $(q_{i,out})$ by heat sink 70 and thermal housings 92 can be represented by the formula $(q_{i,out}) = (H) \times (MAF_i) \times [(T_i) - (CAT_i)]$, where (H) is a constant of proportionality that is specific to the particular heat sink. The constant of proportionality (H) for heat sink 70 and thermal housings 92 can be obtained through thermal modeling of heat sink 70 and thermal housings 92 or through performance testing of a properly functioning heat sink 70 and thermal housings 92.

For the purposes of this disclosure, the rate at which heat is dissipated by heat sink 70 and thermal housings 92 under various thermal operating conditions is learned through performance testing of heat sink 70 and thermal housings 92 that includes operating a properly functioning heat sink 70 and thermal housings 92 under varying temperature and air flow conditions and measuring the rate at which heat is dissipated by the devices. Using this information, tables relating the rate at which heat is dissipated by heat sink 70 and thermal housings 92 under varying temperatures and cooling air flow rates are created and stored within the memory of hybrid control module 28. Thus, at step 210, hybrid control module 28 uses the average of the temperatures $(T_i)$ of heat sink 70 and thermal housings 92 obtained at step 202 and the average of the cooling air temperatures $(CAT_i)$ measured at step 204 to look up in the tables the corresponding rate at which heat is dissipated by heat sink 70 and thermal housings 92 during time interval $(t_i)$. Hybrid control module 28 then calculates the corresponding heat dissipated by each device $(Q_{i,out})$ during the time interval $(t_i)$ using the formula $(Q_{i,out}) = (q_{i,out}) \times (t_i)$.

Next, at step 212 hybrid control module 28 determines an estimated temperature $(T_{i,calc})$ for heat sink 70 and thermal housings 92 at the end of time interval $(t_i)$. The estimated temperature $(T_{i,calc})$ for each device can be calculated using the formula $(T_{i,calc}) = (T_{i-1,calc}) + [(Q_{i,in}) - (Q_{i,out})]/(mC)$, where $(T_{i-1,calc})$ is the estimated temperature calculated at the previous time interval $(t_{i-1})$, $(Q_{i,in})$ is the value for the heat generated determined at step 208, $(Q_{i,out})$ is the value for the heat dissipated determined at step 210, and (mC) is a constant related to the specific heat and mass associated with PEM 42 and BCM 44. Where $(i-1)=0$, meaning $(t_i)=(t_1)$, $(T_{i-1,calc})$ for heat sink 70 and thermal housings 92 is set to the initial temperature obtained for heat sink 70 and thermal housings 92 at step 202. Constant (mC) is a unique constant for PEM 42 and BCM 44 that can be determined through thermal modeling or thermal testing of each device. For purposes of this disclosure, the constant (mC) for PEM 42 and BCM 44 is obtained through thermal testing of each device that includes operating each device at varying power levels and measuring the corresponding rise in temperature under circumstances in which no heat is transferred from each device.

At step 214, hybrid control module 28 calculates the difference $(\Delta T_{i,obs})$ between the estimated temperature $(T_{i,calc})$ for heat sink 70 and thermal housings 92 obtained at step 212 and the value of the last temperature obtained for each device during time interval $(t_i)$ at step 202. Specifically, hybrid control module 28 uses the formula $(\Delta T_{i,obs}) = (T_{i,meas}) - (T_{i,calc})$.

At step 216, hybrid control module 28 obtains a temperature difference set point $(\Delta T_{calib})$ for both PEM 42 and BCM 44, which is a predetermined value that can be stored in the memory of hybrid control module 28. The temperature difference set point $(\Delta T_{calib})$ can be a single predetermined value for each device that is independent of the operating conditions for each device. Alternatively, the temperature difference set point $(\Delta T_{calib})$ can be a predetermined value for each device that is dependent on the specific operating conditions for each device. For example, the value of the temperature difference set point $(\Delta T_{calib})$ for each device can be dependent on one or more factors relating to the operating conditions for each device, including the corresponding current $(i_i)$, voltage $(v_i)$, and temperatures $(T_i)$ obtained by hybrid control module 28 at step 202, the cooling air temperatures $(CAT_i)$ measured at step 204, and the cooling air flow $(MAF_i)$ determined at step 206.

Furthermore, the stored value for the temperature difference set point $(\Delta T_{calib})$ for each device can be predetermined in a variety of different ways. For example, the temperature difference set point $(\Delta T_{calib})$ can be predetermined through development testing and comparison of estimated and actual temperatures for thermal housings 92 and base surface 74 under a variety of operating conditions that includes reduced thermal heat transfer efficiencies of thermal housings 92 and base surface 74. Alternatively, the temperature difference set point $(\Delta T_{calib})$ can be predetermined by setting its value as a percentage of either the estimated temperature $(T_{i,calc})$ or actual temperature $(T_i)$ of thermal housings 92 or base surface 74. For exemplary purposes, a single temperature difference set point $(\Delta T_{calib})$ of 10° C. is used herein for both PEM 42 and BCM 44.

At step 218, hybrid control module 28 compares the temperature difference between the estimated and actual temperatures $(\Delta T_{i,obs})$ calculated at step 214 and the temperature difference set point $(\Delta T_{calib})$ obtained at step 216 for heat sink 70 of PEM 42 and thermal housings 92 of BCM 44. If the temperature difference between the estimated and actual temperatures ($\Delta T_{i,obs}$) for thermal housings 92 is greater than the temperature difference set point ($\Delta T_{calib}$), then hybrid control module 28 will generate a service signal flag for BCM 44 as indicated at step 220 prior to proceeding to step 222. Similarly, if the temperature difference between the estimated and actual temperatures ($\Delta T_{i,obs}$) for heat sink 70 is greater than the temperature difference set point ($\Delta T_{calib}$), then hybrid control module 28 will generate a service signal flag for PEM 42 as indicated at step 220 prior to proceeding to step 222. Thus, using a temperature difference set point of 10° C. for both PEM 42 and BCM 44, if the temperature difference between the estimated and actual temperatures for either PEM 42 or BCM 44 is greater than 10° C., hybrid control module 28 will generate a corresponding service signal flag as previously described.

At step 222, hybrid control module compares the current time interval (i) with the predetermined number of time intervals (n) to determine whether service algorithm 200 has run for each of the predetermined number of time intervals (n). If the current time interval (i) is less than the predetermined number of time intervals (n), then hybrid control module will proceed to step 224. If the current time interval (i) is equal to the predetermined number of time intervals (n), then service algorithm 200 ends.

At step 224, hybrid control module 28 will execute the predetermined time delay ($P_{i+1}$) before returning to step 202 to begin the next iteration of service algorithm 200 for the next time interval.

In the foregoing manner, service algorithm 200 will continue to run for the predetermined number of time intervals and can be used to determine the need to service power package assembly 30 due to problems associated with cooling BCM 44 and PEM 42. Specifically, as problems develop with thermal housings 92 and heat sink 70 that affect the dissipation of heat from BCM 44 and PEM 42, respectively, differences between the estimated temperature and the actual measured temperature for each heat sink device will develop and trigger a corresponding service signal flag when the difference exceeds a predetermined value for the device. It is also contemplated that as problems develop with the battery cells 90 or the PEM 42 in which excessive heat is generated by these devices at a given power level, differences between the actual heat generated by these devices and the calculated heat (i.e. $Q_{i,in}$) will cause differences between the estimated and measured temperatures for their corresponding heat sink device and may trigger a service signal flag. Thus, it will be appreciated that service algorithm 200 can also be used to determine the need to service the power package assembly 30 due to problems with the battery cells 90 and the PEM 42.

While the principles of the present disclosure are described in connection with the electronic devices associated with BAS system 16 of vehicle 10, it will be appreciated by one skilled in the art that the broad teachings of the present disclosure can be implemented in a variety of forms for any electronic device or devices utilizing a heat sink for cooling. Therefore, while this disclosure has been described in connection with a particular example thereof, the true scope of the present disclosure should not be so limited, because it is contemplated that other modifications within the scope of the invention will become apparent to the skilled practitioner upon a study of the drawings, the specification, and the following claims.

What is claimed is:

1. A method of determining a thermal efficiency of a heat sink for an electrical component, comprising:
   determining an average power of said electrical component during one of N time intervals, wherein N is an integer greater than or equal to 1;
   determining an average temperature of a cooling air during said one of N time intervals;
   determining an average mass air flow of said cooling air during said one of N time intervals;
   determining an estimated temperature of said heat sink at said one of N time intervals based on said average power of said electrical component, said average temperature of said cooling air, and said average mass air flow of said cooling air;
   determining an actual temperature of said heat sink; and
   determining said thermal efficiency of said heat sink based on a comparison of said estimated temperature and said actual temperature.

2. The method of claim 1 wherein N is a predetermined value.

3. The method of claim 1 wherein a duration of said one of said N time intervals is different from durations of others of said N time intervals.

4. The method of claim 1 wherein durations of each of said N time intervals are predetermined.

5. The method of claim 1 further comprising determining said estimated temperature at an $i^{th}$ of said N time intervals based on an estimated temperature at an $(i-1)^{th}$ of said N time intervals where $1<i\leq N$.

6. The method of claim 1 wherein two of said N time intervals are separated by a time delay.

7. The method of claim 6 wherein a duration of said time delay is zero.

8. A method of determining a thermal efficiency of a heat sink for an electrical component, comprising:
   determining an estimated temperature of said heat sink;
   determining an actual temperature of said heat sink; and
   determining said thermal efficiency of said heat sink based on a comparison of said estimated temperature and said actual temperature, wherein said determining said estimated temperature of said heat sink includes determining an average power of said electrical component, determining an average temperature of a cooling air flow associated with said heat sink, and determining an average mass air flow of said cooling air flow.

9. The method of claim 8 wherein said average power, said average temperature, said average mass air flow and said estimated temperature are determined at least one of N time intervals, N being an integer greater than or equal to 1.

10. A method of determining a thermal efficiency of a heat sink for an electrical component comprising:
    determining an estimated temperature of said heat sink at N time intervals, wherein N is an integer that is greater than 1 and said estimated temperature at an $i^{th}$ of said N time intervals is based on said estimated temperature at an $(i-1)^{th}$ of said N time intervals where $1<i\leq N$;
    measuring an actual temperature of said heat sink at said N time intervals;
    calculating a difference between said estimated temperature and said actual temperature at said N time intervals; and
    generating a status signal associated with said thermal efficiency of said heat sink based on a comparison of said difference to a predetermined value.

11. The method of claim 10 wherein N is a predetermined value.

12. The method of claim 10 wherein durations of each of said N time intervals are predetermined.

13. The method of claim 10 wherein there are no time delays between each of said N time intervals.

* * * * *